US010746879B2

(12) United States Patent
Sagiraju (10) Patent No.: US 10,746,879 B2
(45) Date of Patent: Aug. 18, 2020

(54) METHOD FOR EFFICIENTLY DETECTING IMPAIRMENTS IN A MULTI-CONSTELLATION GNSS RECEIVER

(71) Applicant: Samsung Electronics Co., Ltd., Gyeonggi-do (KR)

(72) Inventor: Phanikrishna Sagiraju, Cedar Rapids, IA (US)

(73) Assignee: Samsung Electronics Co., Ltd (KR)

( * ) Notice: Subject to any disclaimer, the term of this patent is extended or adjusted under 35 U.S.C. 154(b) by 355 days.

(21) Appl. No.: 15/900,198

(22) Filed: Feb. 20, 2018

(65) Prior Publication Data

US 2018/0172836 A1 Jun. 21, 2018

Related U.S. Application Data

(63) Continuation of application No. 14/998,029, filed on Jul. 7, 2014, now Pat. No. 9,897,701.

(Continued)

(51) Int. Cl.
*G01S 19/20* (2010.01)
*G01S 19/21* (2010.01)
(Continued)

(52) U.S. Cl.
CPC ............. *G01S 19/20* (2013.01); *G01S 19/21* (2013.01); *G01S 19/22* (2013.01); *G01S 5/0027* (2013.01);
(Continued)

(58) Field of Classification Search
CPC .................................. G01S 19/20; G01S 19/21
(Continued)

(56) References Cited

U.S. PATENT DOCUMENTS 4,445,118 A * 4/1984 Taylor .................. G01S 5/0027
342/356
5,420,592 A * 5/1995 Johnson .................. G01S 11/10
342/357.46

(Continued)

FOREIGN PATENT DOCUMENTS

WO    WO 2009/108915    9/2009

OTHER PUBLICATIONS

Letizia Lo Presti et al., Acquisition systems for GNSS signals with the same code and bit rates, 2008 IEEE, 195-187.

(Continued)

*Primary Examiner* — Peter M Bythrow
*Assistant Examiner* — Helena H Seraydaryan
(74) *Attorney, Agent, or Firm* — The Farrell Law Firm, P.C.

(57) ABSTRACT

Apparatuses, methods, and systems are described for a receiver of signals from one or more satellite navigational systems to detect and/or eliminate impaired satellites/signals and/or "false positives" from the set of satellites being estimated/acquired. One method includes acquiring coarse position, time, and frequency values for each of a plurality of satellites from one or more satellite navigational systems and then selecting a set of satellites based on whether one or more of their corresponding acquired coarse values are within a minimum range. An intersection point of the position domain correlograms generated from vectors of each satellite in the selected set is determined and, using that intersection point, satellites/signals are eliminated from the selected set of satellites.

20 Claims, 4 Drawing Sheets

Related U.S. Application Data (60) Provisional application No. 61/888,230, filed on Oct. 8, 2013.

(51) Int. Cl.
  G01S 19/08 (2010.01)
  G01S 19/22 (2010.01)
  G01S 19/28 (2010.01)
  G01S 5/00 (2006.01)
  G01S 19/33 (2010.01)
  G01S 19/24 (2010.01)

(52) U.S. Cl.
  CPC ............. *G01S 19/08* (2013.01); *G01S 19/215* (2013.01); *G01S 19/24* (2013.01); *G01S 19/28* (2013.01); *G01S 19/33* (2013.01)

(58) Field of Classification Search
  USPC ......................................................... 342/14
  See application file for complete search history.

(56) References Cited

U.S. PATENT DOCUMENTS

| | | | |
|---|---|---|---|
| 5,781,152 | A | 7/1998 | Renard et al. |
| 6,236,354 | B1 * | 5/2001 | Krasner ................. G01S 19/21 342/357.59 |
| 6,707,423 | B2 | 3/2004 | Turetzky |
| 7,205,935 | B2 | 4/2007 | Sleewaegon |
| 7,209,076 | B2 | 4/2007 | Roh |
| 7,924,220 | B1 | 4/2011 | Lennen et al. |
| 8,059,700 | B2 | 11/2011 | Lopez-Risueno |
| 8,184,047 | B1 | 5/2012 | Lennen |
| 2002/0012411 | A1 | 1/2002 | Heinzl |
| 2004/0042568 | A1 | 3/2004 | Rowitch |
| 2004/0196183 | A1 | 10/2004 | Roh |
| 2005/0032513 | A1 | 2/2005 | Norman |
| 2005/0099334 | A1 | 5/2005 | Roh |
| 2006/0222058 | A1 | 10/2006 | Simic |
| 2006/0245479 | A1 | 11/2006 | Raman |
| 2009/0268788 | A1 | 10/2009 | Simic |
| 2011/0068973 | A1 | 3/2011 | Humphreys |
| 2011/0103432 | A1 | 5/2011 | Tangudu |
| 2013/0257647 | A1 | 10/2013 | Sagiraju et al. |
| 2014/0132446 | A1 | 5/2014 | Lennen |
| 2014/0266874 | A1 | 9/2014 | Hoang |

OTHER PUBLICATIONS

Christopher J. Comp et al., Adaptive SNR-Based Carrier Phase Multipath Mitigation Technique, IEEE Transactions on Aerospace and Electronic Systems vol. 34, Jan. 1998, pp. 264-276.

Ediz Cetin et al., Analysis and Compensation of RF Impairments for Next Generation Multimode GNSS Receivers, 2007 IEEE, 1729-1732.

Kewen Sun et al., Channels Combining Techniques for a Novel Two Steps Acquisition of New Composite GNSS Signals in Presence of Bit Sign Transitions, 2010 IEEE, 443-457.

Penina Axelrad et al., Enhancing GNSS Receiver Sensitivity by Combining Signals from Multiple Satellites, Jan. 1, 2010, (pp. 18).

D. Borio et al., Impact of the Acquisition Searching Strategy on the Detection and False Alarm Probabilities in a CDMA Receiver, Apr. 25-27, 2006, 1100-1107.

Daniele Borio et al., Impact of GPS Acquisition Strategy on Decision Probabilities, IEEE Transactions on Aerospace and Electronics Systems vol. 44, Jul. 2008, 996-1011.

Andrey Soloviev et al., A Collaborative GNSS Receiver Architecture for Weak Signal Processing, May/Jun. 2013, 56-68.

Kewen Sun, A Differential Strategy for GNSS Weak Signals Acquisition in Presence of Bit Sign Transitions, 2010 IEEE, (pp. 5).

Ben K. Bradley et al., Performance Analysis of Collective Detection of Weak GPS Signals, 23rd International Technical Meeting of the Satellite Division of the Institute of Navigation, Sep. 21-24, 2010, 3041-3053.

Ziedan, Nesreen I. et al., Multipath and NLOS Signals Identification and Satellite Selection Algorithms for Multi-Constellation Receivers, Proceedings of the 29th Int'l Technical Meeting of the ION Satellite Division, Portland, OR, Sep. 12-16, 2016, pp. 521-533.

Petovello, Mark, GNSS Solutions: How Does Non-Line-of-Sight Reception Differ From Multipath Interference?, Inside GNSS, Nov./Dec. 2013, pp. 40-44.

Walter, Todd et al., Satellite Selection for Aviation Users of Multi-Constellation SBAS, Inside GNSS, Nov./Dec. 2016, pp. 50-58.

\* cited by examiner

METHOD FOR EFFICIENTLY DETECTING IMPAIRMENTS IN A MULTI-CONSTELLATION GNSS RECEIVER

PRIORITY

This application is a Continuation of, and claims priority under 35 U.S.C. § 120 to, U.S. patent application Ser. No. 14/998,029, which was filed on Jul. 7, 2014, issued as U.S. Pat. No. 9,897,701 on Feb. 20, 2018, and claimed priority under 35 U.S.C. § 119(e) to U.S. Provisional Patent Application Ser. No. 61/888,230 filed on Oct. 8, 2013, the entire disclosures of all of which are incorporated herein by reference.

BACKGROUND OF THE INVENTION

1. Field of the Invention

The present invention relates generally to detecting impairments in a multi-constellation Global Navigation Satellite System (GNSS) receiver, and more particularly to providing a quick and efficient means of detecting impairments in GNSS receivers, regardless of which constellations are being used.

2. Description of the Related Art

Satellite navigational systems provide positional and timing information to earth-bound receivers. Each system has its own constellation of satellites orbiting the Earth, and, in order to calculate its position, a receiver on Earth uses the satellites "in view" (i.e., in the sky above) from that system's constellation. Global Navigational Satellite System (GNSS) is often used as the generic term for such a system, even though such navigational satellite systems include regional and augmented systems—i.e., systems that are not truly "global." The term "GNSS," as used herein, covers any type of navigational satellite system, global, regional, augmented or otherwise, unless expressly indicated otherwise.

The number of GNSS systems, both planned and presently operational, is growing. The widely-known, widely-used, and truly global Global Positioning System (GPS) of the United States has been joined by one other global system, Russia's GLObalnaya NAvigatsionnaya Sputnikovaya Sistema (GLONASS), and is presently being joined by Europe's Galileo and China's BeiDou (also known, in its second generation, as COMPASS) systems—each of which has, or will have, its own constellation of satellites orbiting the globe. Regional systems (those that are not global, but intended to cover only a certain region of the globe) include Japan's Quasi-Zenith Satellite System (QZSS) and the Indian Regional Navigational Satellite System (IRNSS) currently being developed. Augmented systems are normally regional as well, and "augment" existing GNSS systems with, e.g., messages from ground-based stations and/or additional navigational aids. These include the Wide Area Augmentation System (WAAS), European Geostationary Navigation Overlay Service (EGNOS), Multi-functional Satellite Augmentation System (MSAS), and GPS Aided Geo Augmented Navigation (GAGAN). Regional GNSS systems, such as QZSS, can also operate as augmented systems.

Moreover, GNSS capabilities are no longer limited to any particular type of system or device. A GNSS receiver may be implemented in a mobile terminal, a tablet computer, a camera, a portable music player, and a myriad of other portable and/or mobile personal consumer devices, as well as integrated into larger devices and/or systems, such as the electronics of a vehicle. The term "GNSS receiver" as used herein, covers any such implementation of GNSS capabilities in a device or system.

Broadly speaking, the reception/processing of GNSS signals involves three phases: acquisition, tracking, and positional calculation, also referred to as "navigation solution" or Position-Velocity-Timing (PVT) solution.

Figure 1:
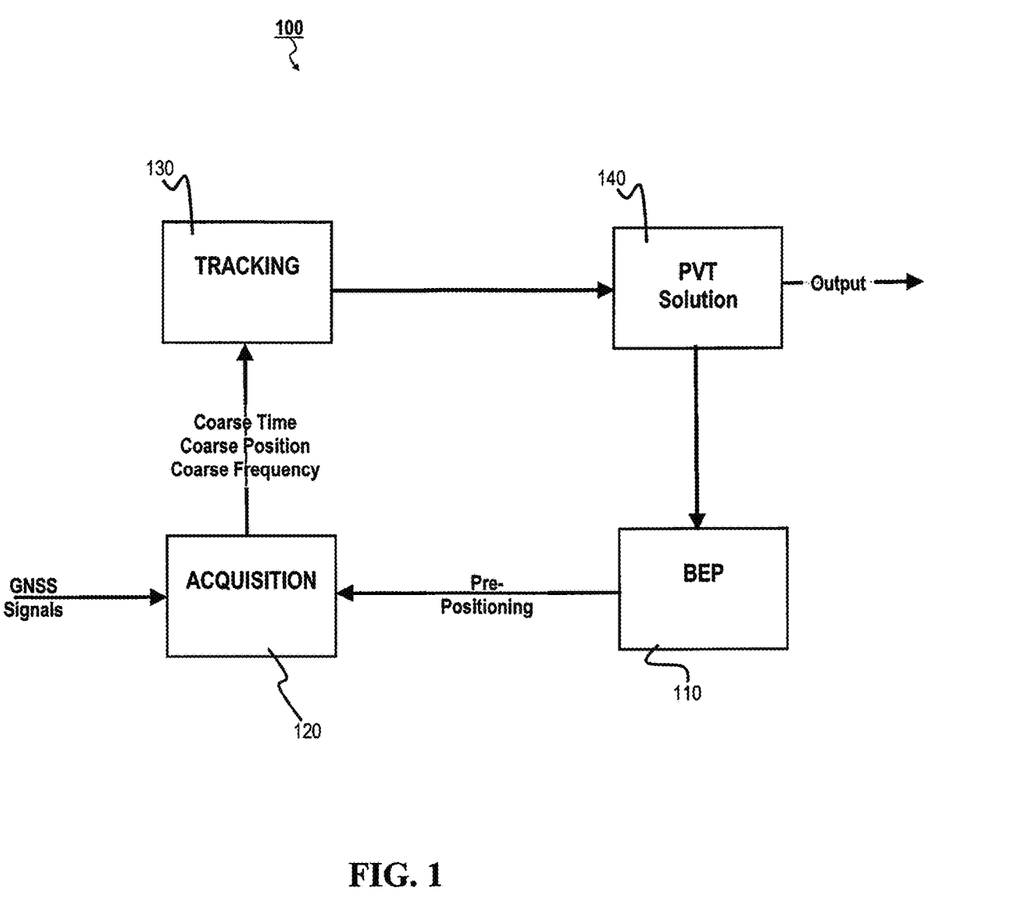
FIG. 1 is a diagram of the GNSS receiving/processing functions in a typical GNSS system to which embodiments of the present invention may be applied.

FIG. 1 is a diagram of these functions in a typical GNSS system. The Estimator or Best Estimates of Pre-positioning (BEP) module 110 estimates the present location of all satellites, or Space Vehicles (SVs), in view based on the GNSS receiver's location, the time, and previously stored information concerning the orbits of the SVs in view from one or more GNSS constellations. The resulting Pre-Positioning information, including estimated azimuth and elevation coordinates for each SV, is output to Acquisition module 120 which uses these estimated locations to "acquire" the actual rough locations of (at least some of) the SVs using the GNSS Signals presently being received. Generally, acquisition involves (1) detecting each SV signal in code delay (in most GNSS systems, each SV has its own CDMA code) and Doppler frequency; and (2) determining the rough code delay and Doppler frequency (and position) of any detected SV's. The two dimensions of code delay and Doppler frequency are often referred to as the acquisition search space.

Acquisition module 120 outputs this coarse data—code delay, Doppler frequency, and position—to Tracking module 130. Tracking module 130 provides the fine tuning for the received coarse data, specifically tracking the GNSS signals of the acquired SV's with loops, typically a Delay Locked Loop and a Phase Locked Loop. With that sort of tracking precision, the data embedded in the GNSS signal can finally be decoded and used. That decoded data, along with other information, is forwarded to PVT Solution module 140, which uses the data/information to calculate the position, velocity, and/or exact time of the present location of the GNSS receiver. PVT Solution module 140, in turn, provides BEP module 110 with these current calculations, thereby creating a constantly repeating loop of estimating, selecting, tracking, calculating; and updating.

The feedback loop between the components in FIG. 1 makes the process adaptive, meaning that information concerning present conditions is fed between the components to further increase, e.g., the accuracy of the process. For example, if Tracking module 130 determines that one or more SVs that were being tracked are presently blocked from view, that information can be fed back to BEP module 110 and/or Acquisition module 120 to eliminate those SVs from the process in the next loop. Of course, there are further complexities to the actual reception and processing of GNSS signals, such as various loops feeding back information between these phases for further correction and adjustment of data, as is known to one of ordinary skill in the art.

FIG. 1 is a high-level abstraction of the functions involved in the system, meaning that, although hardware is necessarily involved with all of the functions described in reference thereto, the individual functions depicted therein may be merged together and/or further separated out (by dividing a function into subfunctions), and may be performed by software, hardware, or a combination of the two. For example, BEP module 110, Acquisition module 120, Tracking module 130, and PVT Solution module 140 are depicted as separate entities (which the functions are, conceptually), but their functions may be implemented in the same piece of hardware, or partially overlap, or each be implemented in separate processors, or even one or more functions may be further broken down into sub-functions, which are performed on different processors. Moreover, the functionality may be further distributed, such as in an augmented system, where, for example, the Pre-positioning information might be provided (or augmented) by local terrestrial broadcast. The possible functionality and/or various implementations of BEP module 110, Acquisition module 120, Tracking module 130, and PVT Solution module 140 are well-known to one of ordinary skill in the art, although the specific implementations and/or functionalities may be called by different names depending on the embodiment. Indeed, although widely used, the terms "acquisition" and "tracking" are used differently in different contexts—e.g., all of the BEP module 110 functions are considered part of the acquisition stage in some discussions in the art. The specific implementation of these functionalities depends on the usage and type of GNSS receiver and satellite constellation(s) involved, as is well-known to one of ordinary skill in the art.

Acquisition and tracking may appear to be doing roughly the same thing on different scales, but this is not the case. If finding and processing GNSS signals may be understood as a search and rescue operation in the middle of the Pacific Ocean, acquisition is the initial effort to locate the survivors anywhere in that vast expanse, while tracking can be understood as tracking the location of the survivors once they are found. In short, acquisition requires much more computing resources than tracking.

GNSS signals, transmitted from SV's in orbits at about 20,000 kilometers, are very weak when received by the GNSS receiver located on the earth's surface, and are thus highly susceptible to impairments, such as interference. Impairments to GNSS signal reception include, e.g., cross correlation between the weak GNSS signal of an intended target SV and the strong GNSS signal of another SV, multipath interference caused by multiple copies of the same GNSS signal arriving at the GNSS receiver at different times (each copy is the same GNSS signal but which took a different path, e.g., bounced off a building), and spurious and out-of-band emissions from other sources. Regardless of source, interfering signals can generally be classified as pulsed, continuous wave (CW), or swept. Pulsed interference comes from surveying and radionavigation equipment; CW interference comes from electronic devices with local oscillators that can produce harmonics in the GNSS bands (including, e.g., personal computers and mobile phones); and swept interference comes from sources with a narrowband instantaneous frequency which changes over time, such as, e.g., broadcast TV and radio stations.

Since GNSS signal acquisition uses correlation to detect specific SV signals, correlation impairments/interference that can cause "false positives" are of particular concern. One example is the cross-correlation mentioned above between the weak GNSS signal of an intended target SV and the strong GNSS signal of another SV. In this case, the unwanted SV signal has a higher peak in the correlogram of the acquisition frequency/delay search space that the desired SV signal, causing the unwanted SV signal to be "acquired" as the desired SV signal. Another example is caused by the sidelobes of the GNSS signal, which, if strong enough, can be mistakenly "acquired" as the main GNSS signal.

Each type of GNSS impairment has resulted in its own individual mitigation technique, which vary in complexity and time required to identify and/or ameliorate each individual impairment. Besides being focused on only type of impairment, most mitigation techniques are also constellation dependent, and thus a multi-constellation GNSS receiver would require several mitigation functions to eliminate the exact same type of impairment in the various GNSS constellations. Moreover, most mitigation techniques focus on the individual SV being acquired and/or tracked, i.e., must be performed for each SV in view (or estimated to be in view).

Thus, methods, systems, and devices are needed to quickly and efficiently detect impairments, either as an adjunct to other impairment detection/mitigation techniques or as a stand-alone capability.

SUMMARY OF THE INVENTION

Accordingly, an aspect of the present invention provides quick and efficient methods and apparatuses for detecting impairments in GNSS receivers. In one aspect of the present invention, the information available across all estimated satellites in view is used to identify impairments. In another aspect of the present invention, a single technique, rather than multiple techniques, is used to make impairment decisions based on information available, thereby making it much quicker than individual impairment checks using multiple techniques.

According to one aspect of the present invention, a method for a receiver of signals from one or more satellite navigational systems is provided, including acquiring coarse position, time, and frequency values for each of a plurality of satellites from one or more satellite navigational systems, the plurality of satellites being those currently estimated to be in view of the receiver; determining whether one or more of the acquired coarse values are within a minimum range; and if it is determined that the one or more acquired coarse values are within the minimum range: determining a pseudo-true peak of a position domain correlogram comprising Line of Sight (LOS) vectors of each of the plurality of satellites; and identifying any satellite whose cross-correlation peak is beyond a maximum distance from the pseudo-true peak as an impaired satellite.

According to another aspect of the present invention, a method is provided, including acquiring coarse position, time, and frequency values for each of a plurality of satellites from one or more satellite navigational systems; selecting a set of satellites based on whether one or more of their corresponding acquired coarse values are within a minimum range; generating a position domain correlogram from vectors of each satellite in the selected set; determining an intersection point in the generated position domain correlogram of the satellites in the selected set; and eliminating any satellite having a cross-correlation peak beyond a maximum distance from the intersection point.

According to still another aspect of the present invention, a portable device having a receiver of signals from one or more satellite navigational systems is provided, including one or more processors; and at least one non-transitory computer-readable medium having program instructions recorded thereon, the program instructions configured to have the one or more processors perform the steps of: acquiring coarse position, time, and frequency values for each of a plurality of satellites from one or more satellite navigational systems; selecting a set of satellites based on whether one or more of their corresponding acquired coarse values are within a minimum range; generating a position domain correlogram from vectors of each satellite in the selected set; determining an intersection point in the generated position domain correlogram of the satellites in the selected set; and eliminating any satellite having a cross-correlation peak beyond a maximum distance from the intersection point.

According to yet another aspect of the present invention, a portable device is provided, including a receiver of signals from one or more satellite navigational systems; and one or more processors configured to perform at least one of (i) generating a position domain correlogram comprising Line of Sight (LOS) vectors of each of a plurality of satellites from one or more satellite navigational systems, the plurality of satellites being those currently estimated to be in view of the receiver; (ii) determining a pseudo-true peak of the position domain correlogram; and (iii) identifying any satellite whose cross-correlation peak is beyond a maximum distance from the pseudo-true peak as an impaired satellite.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

In general, the present application relates to quickly and efficiently detecting impairments in a GNSS receiver. More specifically, signals likely being "false positives" are identified and eliminated from the on-going tracking-acquisition-calculating loop, thereby eliminating a wasted use of computing resources as well as reducing inaccuracies in PVT calculations/measurements. Methods, systems, and devices to quickly and efficiently detect/eliminate impairments according to the present invention may be implemented as adjuncts to and/or replacements of other impairment detection/mitigation techniques or as stand-alone methods, systems, and devices.

Figure 2:
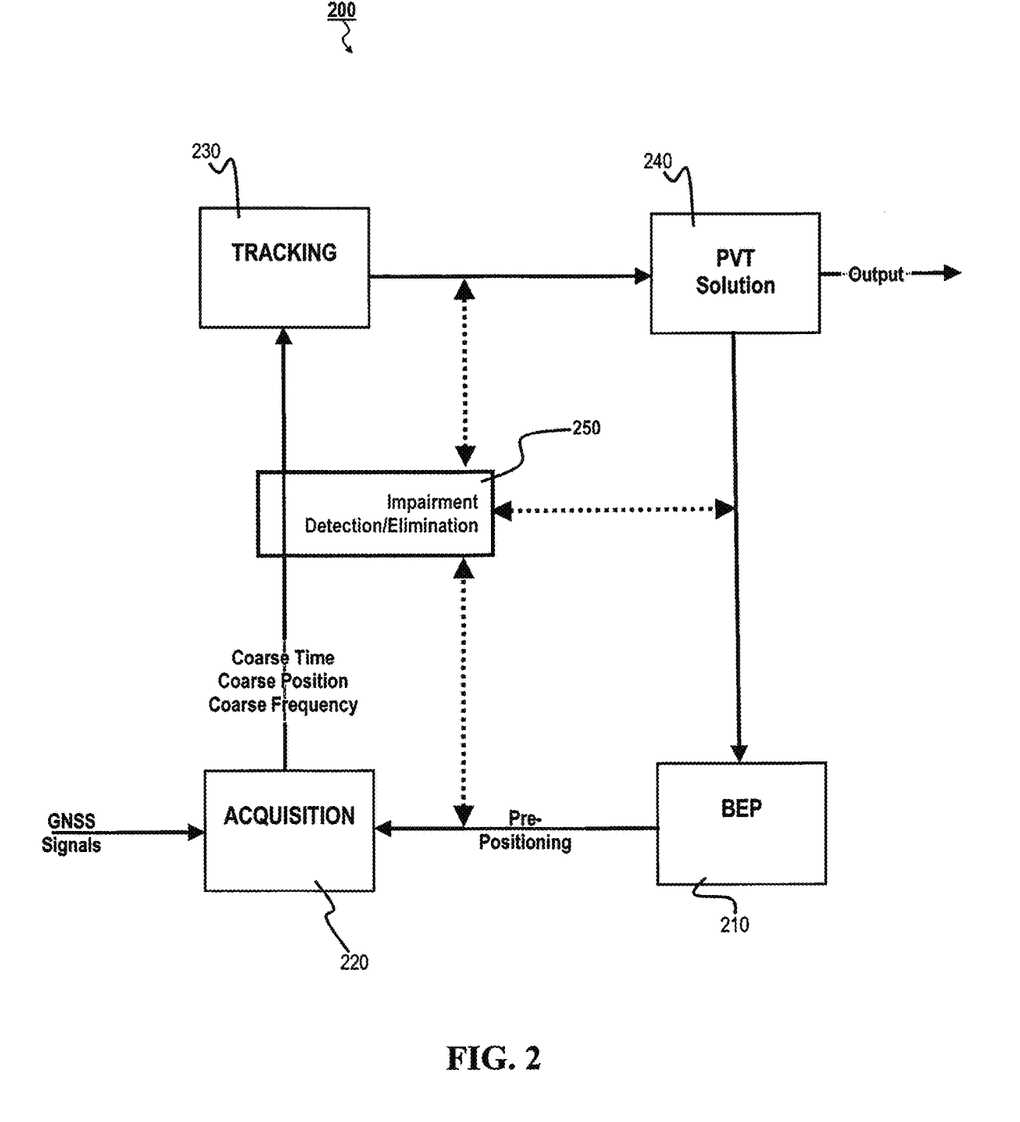
FIG. 2 is a diagram of the GNSS receiving/processing functions in a GNSS system to which an embodiment of the present invention has been applied.

FIG. 2 is a diagram of the GNSS receiving/processing functions in a GNSS system 200 to which an embodiment of the present invention has been applied. BEP module 210, Acquisition module 220, Tracking module 230, and PVT Solution module 240 operate similarly to their counterparts BEP module 110, Acquisition module 120, Tracking module 130, and PVT Solution module 140, respectively, in FIG. 1. Also similarly to FIG. 1, although the various components in FIG. 2 are depicted as separate entities (which the functions are, conceptually), their functions may be implemented in the same piece of hardware, or partially overlap, or each be implemented in separate processors, or even one or more functions may be further broken down into sub-functions, which are performed on different processors or distributed among different systems.

Impairment Detection/Elimination Module 250 in FIG. 2 is an embodiment of the present invention. As shown in FIG. 2, the Impairment Detection/Elimination Module 250 operates mainly on the output of Acquisition module 220 using data calculated by Acquisition module 220, but Impairment Detection/Elimination Module 250 may receive data from any of the other components to assist in performing its task (as indicated by the dotted lines). According to embodiments of the present invention, Impairment Detection/Elimination Module 250 detects impaired SVs in the set of candidate SVs, and then may eliminate them, thereby saving GNSS system 200 from wasting computing resources in tracking, etc., the one or more impaired SVs as the process continues looping.

Figure 3:
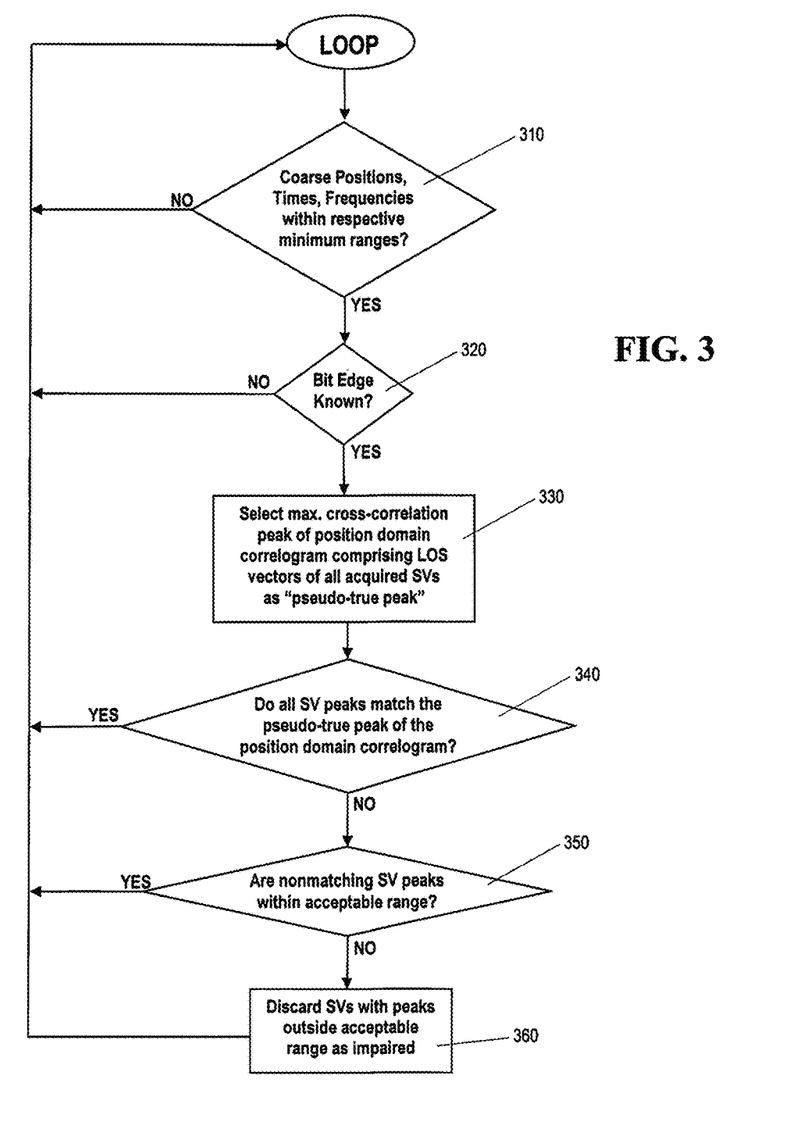
FIG. 3 is a flowchart of a method of detecting impaired satellites according to an embodiment of the present invention.

FIG. 3 is a flowchart of a method of detecting impaired satellites according to an embodiment of the present invention. As indicated by the LOOP oval at the top of FIG. 3, this method is integrated into the continual looping of the GNSS system of which it is a part.

In step 310, it is determined whether the output of Acquisition module 220, i.e., the coarse times, positions, and frequencies of the acquired SVs, are within their respective minimum ranges. In one embodiment of the present invention, the minimum range of the coarse position is within a few kilometers, the minimum range of the coarse time is within several seconds, and the minimum range of the coarse frequency is 0.2 ppm. Appropriate variations in the minimum ranges would depend on the implementation and purpose of the GNSS receiver, as would be known and understood by one of ordinary skill in the art. In some embodiments, a further requirement would be that the ephemerides of the acquired SVs were known (which, in most GNSS receiver implementations, would not be a problem).

If the coarse data is not within minimum ranges in step 310, the method loops back and waits for the next iteration of GNSS calculation to try again. If the coarse data is within the minimum ranges, the method proceeds to step 320. In step 320, it is determined if the bit edge of the received GNSS signals is known, i.e., whether a certain rough level of synchronization has been achieved with the GNSS signals of the set of acquired SVs. If not, once again, the method loops back and waits for the next iteration of GNSS calculation to try again. If the bit edge is known in step 320, the method proceeds to step 330.

Figure 4A:
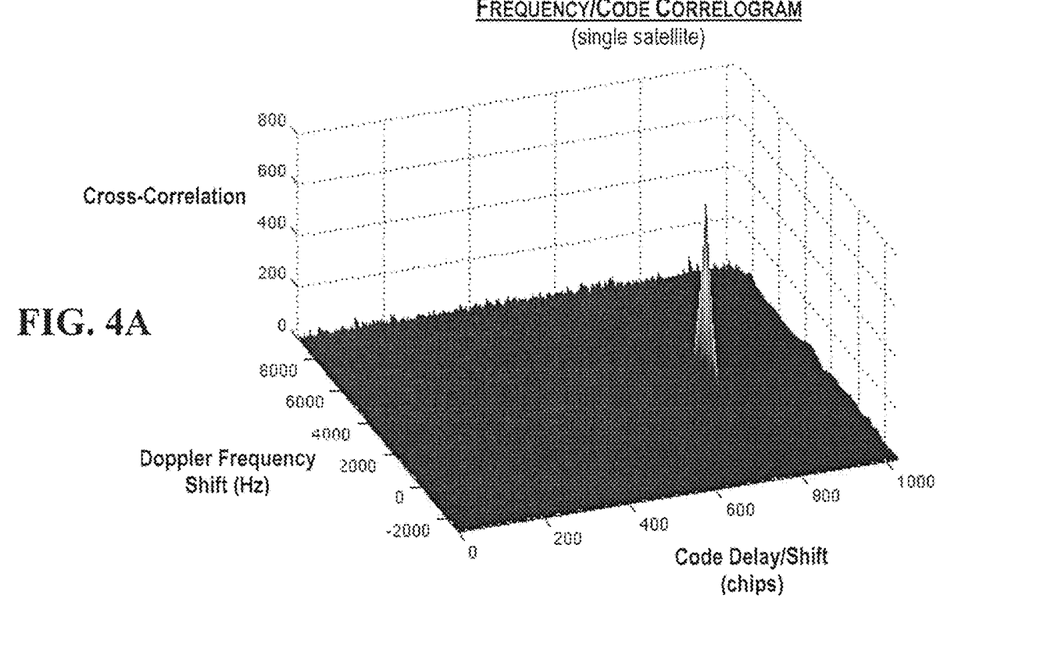
FIG. 4A is a frequency/code correlogram showing the cross-correlation of the Doppler frequency offsets and the code delays/shifts for a single satellite, to which embodiments of the present invention may be applied.

In step 330, the "pseudo-true peak" is selected. In this context, the "pseudo-true peak" is the maximum cross-correlation peak in a position domain correlogram comprising Line of Sight (LOS) vectors of all the acquired SVs. This determination is easily made using data already calculated/processed in Acquisition module 220. In Acquisition module 220, the coarse values for code and frequency of each SV are determined by calculating the equivalent of a frequency/code correlogram. A graphic representation of such a frequency/code correlogram is shown in FIG. 4A, where the cross-correlation of Doppler frequency offsets and code delays/shifts for a single satellite show a distinctive single peak, representing the most likely Doppler frequency shift and code delay/shift for the particular satellite.

As is well-known to one of ordinary skill in the art, "Line of Sight"/"LOS" in this context is not referring to human sight, but rather the "sight" of the receiver. Thus, there can be LOS for a device without there being LOS for a human, as the device's LOS depends on what is received in the reception frequency spectrum for the particular device from that device's location while a human's LOS depends on what is "seen" in the visible light spectrum from that human's vantage point.

With the frequency/code correlogram data for each of the acquired SVs at hand (having been previously calculated by Acquisition module 220), a position domain correlogram may be generated, where the location of the GNSS receiver is indicated as a cross-correlation of NORTH and EAST coordinates. Further discussion and information concerning position domain correlograms may be found in Bradley et al., "Performance Analysis of Collective Detection of Weak GPS Signals," $23^{RD}$ INT'L TECHNICAL MEETING OF THE SATELLITE DIVISION OF THE INSTITUTE OF NAVIGATION, Portland, Oreg., Sep. 21-24, 2010 (hereinafter referred to as "Bradley et al."), pages 3043-3053, the entire contents of which are incorporated herein by reference.

To generate the position domain correlogram, pseudorange offset values are calculated using Equation (1):

$$\Delta\rho = -\cos(az) \times \cos(el) \times \Delta N - \sin(az) \times \cos(el) \times \Delta E \qquad (1)$$

where az=azimuth of a satellite (i.e., coarse position), el=elevation of the satellite (i.e., coarse position), $\Delta N$=the distance to the North from the zero point center of the position domain correlogram, and $\Delta E$=the distance to the East from the zero point center of the position domain correlogram.

Figure 4B:
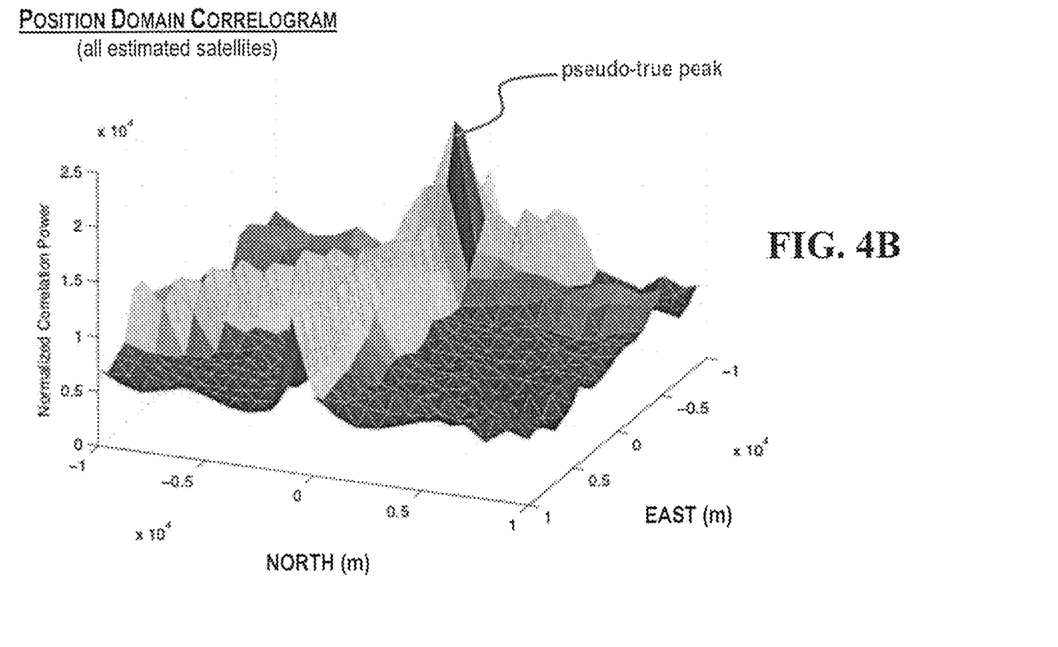
FIG. 4B is a position domain correlogram showing the cross-correlation of Line of Sight (LOS) vectors of a set of estimated satellites in view and the pseudo-true peak thereof, according to an embodiment of the present invention.

Once calculated, these pseudorange offset values are added to pseudorange values obtained by converting the values of the frequency/code correlograms into units of distance. An example of a position domain correlogram is shown in FIG. 4B, which is based on FIG. 10 of Bradley et al. As indicated by FIG. 4B, the position domain correlogram of all of the acquired SVs shows a clear peak, which is referred to herein as the pseudo-true peak or, in the description of Bradley et al., "notice the two distinct ridges in each plot of FIG. 10, intersecting to form the main peak of the correlogram." Id, page 3048.

Having selected the pseudo-true peak using the position domain correlogram in step 330, the locations of the individual cross-correlation peaks for each SV are compared against the pseudo-true peak to determine whether the locations match in step 340. If they do, the method loops back and waits for the next iteration of GNSS calculation to try again. If the peaks of one or more SVs do not match the pseudo-true peak in step 340, the method continues at step 350.

In step 350, it is determined whether the peaks of the one or more SVs that do not match the pseudo-true peak are within an acceptable range. In one embodiment, the acceptable range is about 300 m. Once again, the appropriate acceptable range would depend on the particular implementation and purpose of the GNSS receiver involved. If the peaks of the one or more SVs are within the acceptable range in step 350, the method loops back and waits for the next iteration of GNSS calculation to try again. If the peaks of one or more of the SVs are not within the acceptable range in step 350, the method continues at step 360. In step 360, the one or more SVs with peaks outside the acceptable range are discarded from the set of acquired SVs as impairments.

The method according to embodiments of the present invention efficiently uses information across all of the acquired SVs to determine if one, e.g., of the newly acquired SVs is impaired or not. When using a method according to embodiments of the present invention, the cause or type of impairment need not be determined because the result—the actual impairment—is detected instead. As such, methods and GNSS receivers according to embodiments of the present invention may detect multiple types of impairments using a single method. Impairment checks done according to embodiments of the present invention are much faster than the traditional checks which may take up to 6 seconds in weak signal environments. Moreover, a GNSS receiver and/or methods according to embodiments of the present invention can be applied across multiple GNSS constellations to detect impairments of any SV within any of the multiple GNSS constellations. Furthermore, as a result of its location within the Estimation-Acquisition-Tracking-Calculation loop, methods and GNSS receivers using methods according to embodiments of the present invention ensure that both code phase and frequency domain are determined (in the Acquisition stage) before making the assessment whether a newly detected SV is an impairment signal or real signal.

Further still, methods and GNSS receivers using methods according to embodiments of the present invention are not limited to any of the specifics described in reference to any of the embodiments herein. For example, although one equation for calculating offset ranges is provided in reference to one embodiment, a number of different equations and/or estimations and/or processes may be used in reference to a position domain correlogram in accordance with other embodiments of the present invention. Indeed, the equation discussed in reference to one embodiment above is related to the more-encompassing Equation (2) reproduced below, and discussed more fully in Bradley et al.:

$$\Delta\rho = -\cos(az) \times \cos(el) \times \Delta N - \sin(az) \times \cos(el) \times \Delta E - \sin(el) \times \Delta D - \Delta b \qquad (2)$$

where az=azimuth of a satellite, el=elevation of the satellite, $\Delta N$=the distance to the North from the zero point center of the position domain correlogram, $\Delta E$=the distance to the East from the zero point center of the position domain correlogram, $\Delta D$=the distance UP or DOWN from the zero point center of the position domain correlogram, and $\Delta b$=Clock bias.

Any estimation, equation, process, or procedure for determining the pseudo-true peak may be used in embodiments of the present invention.

Depending on the embodiment of the present invention, some or all of the steps and/or operations may be implemented or otherwise performed, at least in part, using one or more processors running instruction(s), program(s), interactive data structure(s), client and/or server components, where such instruction(s), program(s), interactive data structure(s), client and/or server components are stored in one or more non-transitory computer-readable media. The one or more non-transitory computer-readable media may be instantiated in software, firmware, hardware, and/or any combination thereof.

As mentioned above, some or all of the steps and/or operations of embodiments of the present invention may be implemented or otherwise performed, at least in part, by one or more processors. A "processor" as used herein refers to any device configured to perform one or more operations based on instructions, including, but not limited to, any general purpose processor in communication with a storage medium from which computer-readable instructions can be retrieved, any special-purpose processor configured to execute specific types of instructions (such as a Digital Signal Processor or DSP), any special-purpose processor where some or all of the instructions are hard-wired into the actual processor design, any combination thereof, and/or any other type of processor. A processor as used herein may take any form, from a simple micro-controller to a completely self-contained computing system having a bus, memory controller, cache, etc., to a group or cluster of computing devices networked together to provide greater processing capability (e.g., distributed computing). A processor as used herein may have one or more cores, and a multi-core processor used to implement an embodiment of the present invention may be symmetric or asymmetric. A processor as used herein may include, without limitation, one or more Application-Specific Integrated Circuits ("ASICs"), standard integrated circuits, controllers executing appropriate instructions, and including microcontrollers and/or embedded controllers, Field-Programmable Gate Arrays ("FPGAs"), Complex Programmable Logic Devices ("CPLDs"), microprocessors, and the like.

The one or more non-transitory computer-readable media according to embodiments of the present invention may include, without limitation, non-volatile and volatile media, including but not limited to, a floppy disk, flexible disk, hard disk, RAM, PROM, EPROM, FLASH-EPROM, EEPROM, any memory chip or cartridge, any magnetic tape, or any other magnetic medium from which a computer instruction can be read; a CD-ROM, DVD, or any other optical medium from which a computer instruction can be read; punch cards, paper tape, any other physical medium with one or more patterns of holes, or any other non-transitory medium from which a computer instruction can be read.

Thus, methods according to embodiments of the present invention may be implemented by devices constructed to perform the operations (such as hardware circuits), or implemented as programs and/or higher-level instructions to be provided to one or more processors for performance/implementation (such as instructions stored in a non-transitory memory), and/or that comprises machine-level instructions stored in, e.g., firmware or non-volatile memory. Some or all of any system components and/or data structures may also be stored as contents (e.g., as executable or other non-transitory machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

Accordingly, embodiments of the present invention may be implemented in a wide variety of computing architectures and environments, as would be understood by one of ordinary skill in the art. One or more logical operations of embodiments of the present invention may be implemented as: (1) a sequence of computer implemented steps, operations, or procedures running on one or more general use programmable circuits, (2) a sequence of computer implemented steps, operations, or procedures running on one or more specific-use programmable circuits; and/or (3) interconnected machine modules or program engines within one or more general use and/or specific-use programmable circuits. One or more processors used to perform one or more steps and/or operations in accordance with embodiments of the present invention may also perform other functions, steps, and operations neither considered nor discussed herein (e.g., the one or more processors being multi-functional and/or capable of multi-tasking).

Depending on the embodiment of the present invention, some or all of the steps and/or operations may be implemented or otherwise performed, at least in part, on a portable device. "Portable device" as used herein refers to any mobile or otherwise portable electronic device having the capability of receiving signals via one or more antennae, including, but not limited to, multimedia players, communication devices, computing devices, navigating devices, etc. Thus, mobile devices include (but are not limited to) laptops, tablet computers, Portable Digital Assistants (PDAs), mp3 players, handheld PCs, Instant Messaging Devices (IMD), cellular telephones, Global Navigational Satellite System (GNSS) receivers, watches, or any such device which can be worn and/or carried on one's person.

While several embodiments have been described, it will be understood that various modifications can be made without departing from the scope of the present invention. Thus, it will be apparent to those of ordinary skill in the art that the invention is not limited to the embodiments described, but can encompass everything covered by the appended claims and their equivalents.

What is claimed is:

1. A method, comprising:
   acquiring coarse position, time, and frequency values for each of a plurality of satellites from one or more satellite navigational systems;
   selecting a set of satellites based on whether one or more of their corresponding acquired coarse values are within a minimum range;
   generating a position domain correlogram from vectors of each satellite in the selected set;
   determining an intersection point in the generated position domain correlogram of the satellites in the selected set; and
   eliminating any satellite having a cross-correlation peak beyond a maximum distance from the intersection point.

2. The method of claim 1, wherein determining the intersection point comprises:
   selecting a maximum cross-correlation peak of the position domain correlogram.

3. The method of claim 1, wherein generating the position domain correlogram from vectors of each satellite in the selected set comprises:
   using data generated by acquiring the coarse position, time, and frequency values.

4. The method of claim 1, wherein selecting a set of satellites based on whether one or more of their corresponding acquired coarse values are within a minimum range comprises at least one of:

determining whether the acquired coarse positions are less than or equal to a minimum distance;
determining whether the acquired coarse times are less than or equal to a minimum time interval; and
determining whether the acquired coarse frequencies are less than or equal to a minimum parts per million (ppm).

5. The method of claim 1, wherein acquiring the coarse position, time, and frequency values for each of the plurality of satellites comprises:
generating a frequency/code correlogram for each of the plurality of satellites.

6. The method of claim 5, wherein each frequency/code correlogram comprises a Doppler frequency shift/code delay correlogram.

7. The method of claim 5, wherein generating the position domain correlogram from vectors of each satellite in the selected set comprises:
using data from the generated frequency/code correlograms.

8. The method of claim 7, wherein generating the position domain correlogram from vectors of each satellite in the selected set comprises:
calculating pseudorange offset values using both the data from the generated frequency/code correlograms and data generated when acquiring the coarse position, time, and frequency values.

9. The method of claim 8, wherein generating the position domain correlogram further comprises:
adding the calculated pseudorange offset values to pseudorange values obtained by converting values of the generated frequency/code correlograms into units of distance.

10. The method of claim 1, wherein the one or more satellite navigational systems comprise at least two satellite navigational systems.

11. The method of claim 10, wherein the at least two satellite navigational systems comprise at least two of the Global Positioning System (GPS), the Galileo system, the Beidou system, the GLONASS system, the Quasi-Zenith Satellite System (QZSS), the Indian Regional Navigational Satellite System (IRNSS), the Wide Area Augmentation System (WAAS), the European Geostationary Navigation Overlay Service (EGNOS), the Multi-functional Satellite Augmentation System (MSAS), and the GPS Aided Geo Augmented Navigation (GAGAN).

12. A portable device including a receiver of signals from one or more satellite navigational systems, comprising:
one or more processors; and
at least one non-transitory computer-readable medium having program instructions recorded thereon, the program instructions configured to have the one or more processors perform the steps of:
acquiring coarse position, time, and frequency values for each of a plurality of satellites from one or more satellite navigational systems;
selecting a set of satellites based on whether one or more of their corresponding acquired coarse values are within a minimum range;
generating a position domain correlogram from vectors of each satellite in the selected set;
determining an intersection point in the generated position domain correlogram of the satellites in the selected set; and
eliminating any satellite having a cross-correlation peak beyond a maximum distance from the intersection point.

13. The portable device of claim 12, wherein determining the intersection point comprises:
selecting a maximum cross-correlation peak of the position domain correlogram.

14. The portable device of claim 12, wherein generating the position domain correlogram from vectors of each satellite in the selected set comprises:
using data generated by acquiring the coarse position, time, and frequency values.

15. The portable device of claim 12, wherein selecting a set of satellites based on whether one or more of their corresponding acquired coarse values are within a minimum range comprises at least one of:
determining whether the acquired coarse positions are less than or equal to a minimum distance;
determining whether the acquired coarse times are less than or equal to a minimum time interval; and
determining whether the acquired coarse frequencies are less than or equal to a minimum parts per million (ppm).

16. The portable device of claim 12, wherein acquiring the coarse position, time, and frequency values for each of the plurality of satellites comprises:
generating a frequency/code correlogram for each of the plurality of satellites.

17. The portable device of claim 16, wherein each frequency/code correlogram comprises a Doppler frequency shift/code delay correlogram.

18. The portable device of claim 16, wherein generating the position domain correlogram from vectors of each satellite in the selected set comprises:
using data from the generated frequency/code correlograms.

19. The portable device of claim 18, wherein generating the position domain correlogram from vectors of each satellite in the selected set comprises:
calculating pseudorange offset values using both the data from the generated frequency/code correlograms and data generated when acquiring the coarse position, time, and frequency values.

20. The portable device of claim 19, wherein generating the position domain correlogram further comprises:
adding the calculated pseudorange offset values to pseudorange values obtained by converting values of the generated frequency/code correlograms into units of distance.

* * * * *